March 24, 1931.  N. A. GAGE  1,797,826

CLUTCH FOR AUTOMATIC TRANSMISSIONS

Filed Jan. 30, 1926  2 Sheets-Sheet 1

Witness:
J. Buckhardt

Inventor:
Nelson A. Gage,
By Cromwell, Greist & Warden
Attys.

March 24, 1931. N. A. GAGE 1,797,826
CLUTCH FOR AUTOMATIC TRANSMISSIONS
Filed Jan. 30, 1926 2 Sheets-Sheet 2
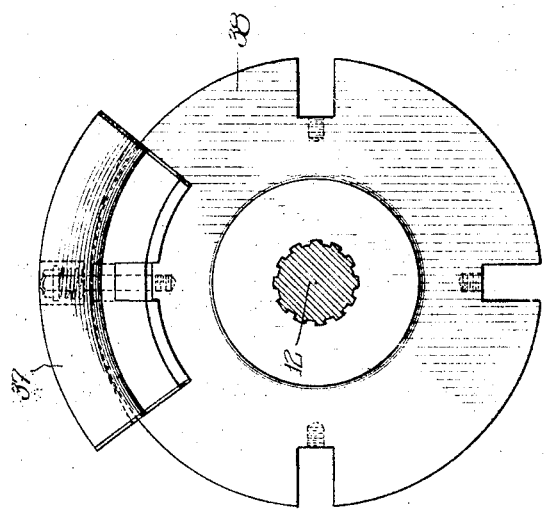
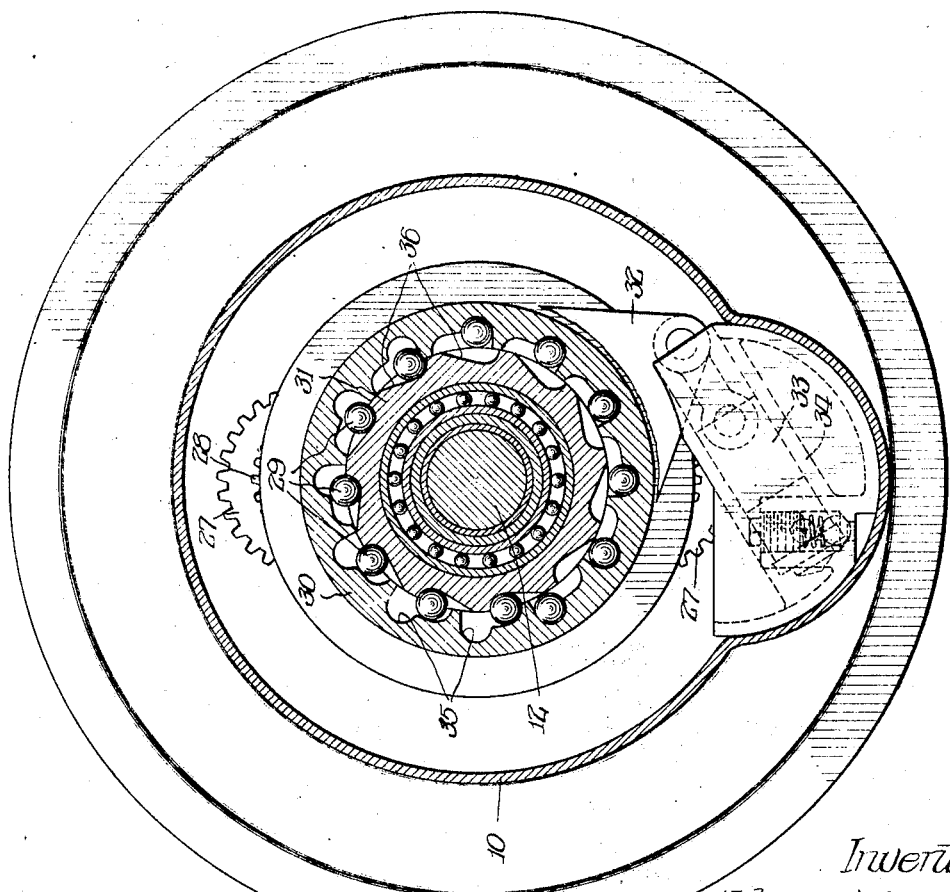
Witness:
R. Burkhardt
Inventor:
Nelson A. Gage,
By Cromwell, Greist & Warden
Attys Patented Mar. 24, 1931

1,797,826

UNITED STATES PATENT OFFICE

NELSON A. GAGE, OF CHICAGO, ILLINOIS, ASSIGNOR TO FLEXO-DRIVE CORPORATION, OF ROCKFORD, ILLINOIS, A CORPORATION OF ILLINOIS

CLUTCH FOR AUTOMATIC TRANSMISSIONS

Application filed January 30, 1926. Serial No. 84,825.

The present invention relates to automatic transmissions and has particular reference to an improved friction clutching device which is specially adapted for that type of transmission disclosed in the co-pending application of David W. Jones filed Jan. 29, 1926, Serial No. 84,558.

A transmission of the type described is entirely practicable, but it will not function as quickly as might be desired in reaching what would correspond in an ordinary shiftable gear transmission to a high gear ratio, nor will it function as slowly as might be desired in discontinuing that ratio. These characteristics have occasioned the improvement which constitutes the present invention.

The purpose of the invention is to provide an improved clutching device for a transmission of the type described in which the centrifugally operated friction shoes of the clutching device and the drum with which they coact are so shaped and arranged as to produce more quickly a condition of static frictional engagement therebetween and thereafter maintain such condition longer during deceleration.

Other objects and advantages of the invention will be evident to those skilled in the art upon a full understanding of the nature of the frictionally coacting shoe and drum parts incorporated in the transmission; the invention residing substantially in the novel construction and shaping of such parts.

A preferred embodiment of the invention is set forth in the accompanying drawings and following description, but it will be understood that the invention is also susceptible of embodiment in many other structurally different forms which come equally within the contemplation of the invention.

In the drawings:

Fig. 2 is a vertical transverse section taken on the line 2—2 of Fig. 1; and

Fig. 3 is an end view of one of the shoe-supporting spiders, showing one of the centrifugally operated friction shoes in place thereon.

Figure 1:
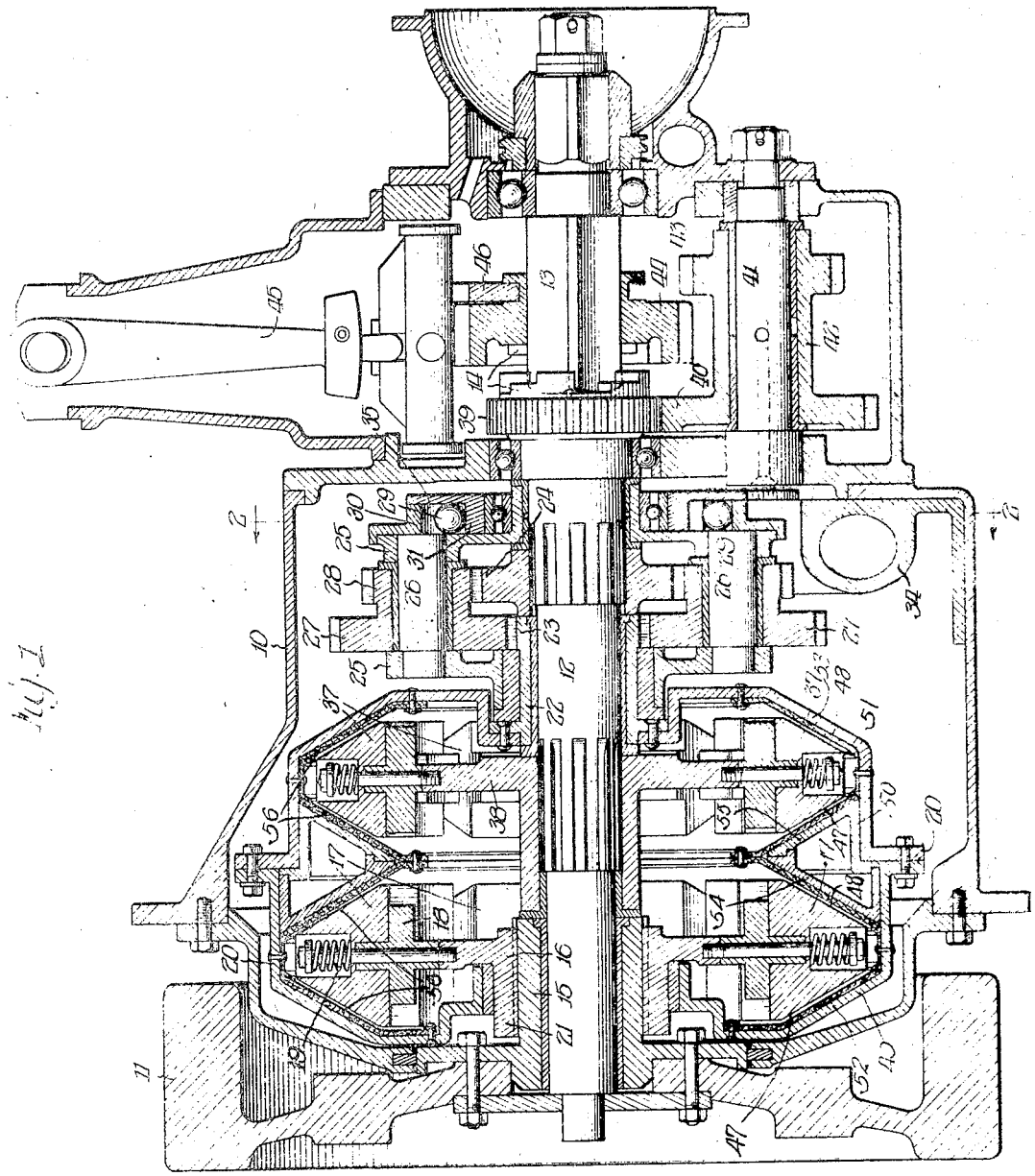
Fig. 1 is a vertical longitudinal section taken through the center of the transmission.

The transmission illustrated in the drawings is similar, in its general features of construction, arrangement and operation, to that disclosed in the above mentioned application of David W. Jones. The transmission is fully automatic, and differs saliently from other types in that it is equipped with two sets of centrifugally operated friction shoes which rotate respectively with the driving and driven elements. One set of shoes has a direct connection with the driving element and acts frictionally against a drum which has a reduced connection through planet gearing with the driven element, and the other set of shoes has a direct connection with the driven element and acts frictionally against the drum driven by the first set, which arrangement gives a device in which the ratio of power transmission is flexible and will automatically vary under control of both the speed and the load to adjust itself properly to any particular operating condition.

The transmission is housed in a casing 10 at the rear of the fly wheel 11 of the associated motor, and includes two axially aligned shafts 12 and 13. For convenience, the fly wheel 11 may be considered the driving element of the transmission, and either the shaft 12 or the shaft 13 the driven element, since the shaft 13 is connected directly with the propeller shaft of the associated chassis and the shaft 12 normally is connected directly with the shaft 13 by means of a manually operable jaw clutch 14. The front end of the shaft 12 is journalled in a central recess in the rear face of the fly wheel.

A sleeve 15 is secured to the hub of the fly wheel 11 and extends rearwardly into the casing 10 about the front end of the shaft 12. A spider 16 is splined to the sleeve and carries a set of shoes 17. The shoes 17 straddle the periphery of the spider, and are transversely notched to receive a plurality of shoe-positioning keys 18 which also seat in notches in the spider. The keys 18 prevent the shoes from moving circumferentially of the spider, but fit loosely in the notches in the shoes and permit the latter to move radially of the spider under centrifugal force against the yielding resistance of suitably mounted return springs 19.

A drum 20 encompasses the set of shoes 17 for frictional coaction with the same in a body of oil contained in the casing. The front end of the drum extends inwardly and is journalled on a sleeve 21 formed on the spider 16, and the rear end extends inwardly and is secured to a sleeve 22 which forms a part of a pinion 23. The pinion 23 is journalled on the shaft 12 and is positioned immediately in front of a larger pinion 24 which is secured to that shaft. A bracket 25 is journalled on the sleeve 22 of the pinion 23 and supports two diametrically disposed counter shafts 26, each of which has rotatably mounted thereon a large pinion 27 and a smaller pinion 28. The pinions 27 and 28 on each of the countershafts are fixedly associated with each other and are meshed respectively with the pinions 23 and 24.

The bracket 25 is free to turn in the direction in which the fly wheel 11 rotates, but is prevented from turning in the reverse direction by means of a plurality of balls 29 which are caged between two ring members 30 and 31. This construction is best shown in Fig. 2. The outer member 30 is secured to the bracket 25, and the inner member 31 is journalled on a sleeve on the bracket and is held against any substantial amount of rotation thereon by a radially extending arm 32 on the member which is connected with a piston 33 in an oil pot 34 positioned in the bottom of the casing 10. The balls 29 are seated by centrifugal force in pockets 35 in the outer member 30 when that member is rotating in the direction in which the fly wheel is rotating, but drop partly into locking pockets 36 in the inner member 31 when the member 30 is at rest and attempts to rotate in the reverse direction, thereby preventing such rotation. The piston 33 is normally kept in its outermost position in the pot 34 by suitable spring means, and, when the member 31 attempts to rotate in a reverse direction, it acts through the piston upon the oil in the pot and is as a consequence brought to a gradual stop as the oil seeps past the piston and permits the latter to bottom. The oil will again enter the pot through a suitable one-way valve as soon as the piston has again resumed its outermost position.

Another set of shoes 37 is positioned within the drum 20 in the space between the shoes 17 and the rear end of the drum. The shoes 37 are carried in the same manner as the shoes 17 on a spider 38, and the spider is splined to the shaft 12.

A pinion 39 is fixedly associated with the shaft 12 at the rear end thereof, and meshes with a larger pinion 40 which is journalled on a countershaft 41 in the lower part of the casing. The pinion 40 is provided with a rearwardly extending sleeve 42 on which a smaller pinion 43 is secured, and the pinions 40 and 43 rotate together on the countershaft 41. Another pinion 44 is non-rotatably but slidably mounted on a squared portion of the shaft 13 and may be shifted into any one of three positions along that shaft. The pinion 44 carries on its front face one of the two interlocking clutch elements of the jaw clutch 14, the other of such elements being carried on the rear face of the shaft 12, and, when the pinion 44 is shifted into its front position, the elements of the clutch will interlock and the shafts 12 and 13 will rotate as a unit. When the pinion 44 is in its intermediate position, as shown in Fig. 1, there is no driving connection between the shafts 12 and 13 and the transmission is in neutral, and, when the pinion 44 is shifted into its rear position, the pinion 43 will become meshed therewith, to effect a driving connection between the shafts 12 and 13 at a reduction. A manually operated lever 45 may be used to shift the pinion 44, through an intermediate connecting yoke 46.

The present invention resides in the construction and arrangement of the shoe and drum parts, as hereinafter described.

The shoes 17 and 37 are tapered outwardly, as shown in Fig. 1, and have two inclined bearing surfaces 47 and 48 for frictional coaction with the drum 20. The surfaces 47 and 48 may be arranged at various inclinations to suit requirements, but an angle of approximately 60° to the axis of the drum has been found to give very satisfactory results.

The drum 20 is shaped to conform with the shoes 17 and 37, and is, for convenience in construction, assembly and repair, composed of three separable sections 49, 50 and 51. The front end section 49 is a disk which has a conical surface portion 52; the rear end section is a somewhat similar disk which has a reversely inclined conical surface portion 53; and the intermediate section 50 is a two-part hollow annulus of triangular form which has two inclined conical surface portions 54 and 55. The three sections are bolted together in such a way as to be taken apart readily when desired. The conical surface portions 52 and 54 coact frictionally with the shoes 17, while the portions 53 and 55 coact with the shoes 37, and all of such surface portions are covered with annular friction linings 56 which are secured about their inner and outer peripheries to the drum by means of suitable retaining rings and rivets.

The shoes 17 are preferably more massive than the shoes 37, and the front portion of the drum 20 with which they coact is preferably of greater diameter than the rear portion.

The shoe and drum construction above described causes the shoes to reach a condition of non-rotatable engagement with the drum much more quickly than if the ordinary cylindrical design of such parts were used, and also causes the shoes to continue in engagement with the drum longer when the speed of rotation of the shoes is decreasing.

The operation of the transmission is as follows:

Ordinarily the elements of the jaw clutch 14 are maintained in interlocked association. When the driving element, represented by the fly wheel 11, is rotating at an idling speed, there will be no transmission of power through the device because the shoes 17 will not be thrown out with sufficient centrifugal force against the drum 20 to frictionally engage with the latter. When the speed of the driving element 11 is accelerated above an idling speed, however, the shoes 17 will frictionally engage with the drum 20 and will gradually bring the drum into synchronous rotation therewith, under which condition the driven element, represented by the shafts 12 and 13, will be rotated slowly through the reduction provided by the planet gearing 23, 24, 27 and 28, which gearing is held against rotation in a reverse direction by the back stop device associated therewith. If the speed thus imparted to the driven element is sufficient to cause the shoes 37 to be thrown outwardly into frictional engagement with the drum, the drum will tend to carry along with it the shoes 37, as it is rotating more rapidly than such shoes, and the driven element with which the shoes 37 are associated will be thereby gradually accelerated to the speed of the drum, the shoes 37 of course pressing with increasing force against the drum 20 as the speed of the driven element increases. The two sets of shoes, the drum and the planet gearing will then all rotate as a unit with the driving and driven elements. When the load resistance increases to an amount in excess of that which the motor will efficiently develop in torque, as in ascending a hill, the shoes 37 will be forced by the resistance to discontinue their static frictional engagement with the drum, and the then forwardly rotating bracket 25 and associated planet gearing will gradually return again to a stationary position in which the transmission will deliver the torque of the motor to the driven element through the reduction provided by the gearing.

I claim:

1. A clutching device of the class described comprising in combination a pair of independently mounted and tapered centrifugal shoes each having two inclined bearing surfaces and a friction drum to co-act with said shoes; said drum comprising interconnected front, rear and intermediate separable sections, the front and rear sections being fashioned as discs with oppositely inclined conical surfaces to provide bearing surfaces for the outside ones of the inclined surfaces on each of said shoes, the intermediate section of the drum being nested between said front and rear sections and comprising a two-part hollow annulus of triangular form having two inclined conical surface portions providing bearing surfaces for the inside confronting inclined surfaces on said shoes.

2. The combination as set forth in claim 1 and in which the front drum and its co-acting shoe are more massive in structure than the rear drum and its co-acting shoe.

In testimony whereof I have hereunto subscribed my name.

NELSON A. GAGE.